(12) United States Patent
Bindle et al.

(10) Patent No.: US 10,567,238 B1
(45) Date of Patent: Feb. 18, 2020

(54) SERVER SYSTEM RING TOPOLOGY USER INTERFACE SYSTEM

(71) Applicant: VMWARE, INC., Palo Alto, CA (US)

(72) Inventors: Sanket Bindle, Gujarat (IN); Rohit Toshniwal, Santa Clara, CA (US); Mukul Gupta, San Jose, CA (US); Shiv Agarwal, Milpitas, CA (US)

(73) Assignee: VMWARE, INC., Palo Alto, CA (US)

( * ) Notice: Subject to any disclaimer, the term of this patent is extended or adjusted under 35 U.S.C. 154(b) by 809 days.

(21) Appl. No.: 14/592,856

(22) Filed: Jan. 8, 2015

Related U.S. Application Data (63) Continuation-in-part of application No. 14/464,579, filed on Aug. 20, 2014, now Pat. No. 9,767,197.

(51) Int. Cl.
*G06F 3/0481* (2013.01)
*H04L 12/24* (2006.01)

(52) U.S. Cl.
CPC .......... *H04L 41/22* (2013.01); *G06F 3/04817* (2013.01)

(58) Field of Classification Search
CPC ......... G06F 17/30864; G06F 17/30867; G06F 17/30637; G06F 3/04817; G06F 16/11; G06F 16/16; H04L 41/22
USPC ...................................................... 707/706
See application file for complete search history.

(56) References Cited

U.S. PATENT DOCUMENTS

| | | | |
|---|---|---|---|
| 4,958,285 A | 9/1990 | Tominaga | |
| 6,433,802 B1 | 8/2002 | Ladd | |
| 6,483,812 B1 * | 11/2002 | Prorock | H04L 12/433 370/252 |
| 7,096,219 B1 | 8/2006 | Karch | |
| 7,266,781 B1 * | 9/2007 | Burlowski | G06F 11/1448 704/204 |
| 7,788,587 B2 * | 8/2010 | Michelman | 715/734 |
| 7,992,102 B1 * | 8/2011 | De Angelo | G06F 3/0482 715/804 |
| 8,230,339 B2 * | 7/2012 | Watanabe | G06F 3/048 715/713 |
| 8,266,550 B1 | 9/2012 | Cleron et al. | |
| 8,443,293 B2 * | 5/2013 | Soerensen | G06F 17/30994 715/722 |
| 9,015,730 B1 | 4/2015 | Allen et al. | |
| 2002/0186827 A1 | 12/2002 | Griffiths | |
| 2003/0184580 A1 * | 10/2003 | Kodosky | G05B 19/0426 715/734 |
| 2006/0052998 A1 * | 3/2006 | Michelman | G06F 9/4443 703/22 |
| 2006/0106585 A1 | 5/2006 | Brown et al. | |
| 2007/0274239 A1 | 11/2007 | Nguyen et al. | |
| 2008/0059487 A1 | 3/2008 | Mi et al. | |

(Continued)

OTHER PUBLICATIONS

Office Action dated May 15, 2018 for U.S. Appl. No. 14/592,845.

*Primary Examiner* — Michael Pham
(74) *Attorney, Agent, or Firm* — Clayton, McKay & Bailey, PC (57) ABSTRACT

A computerized visualization system includes a computer system management system that provides modeling of a computer system having physical entities and virtual entities and a computer display screen having rendered thereon an arrangement of active icons corresponding to physical and virtual entities included in the computer system, the icons being arranged in concentric circular rings having arc segments corresponding to physical host computers.

20 Claims, 10 Drawing Sheets

(56) References Cited

U.S. PATENT DOCUMENTS

| | | |
|---|---|---|
| 2008/0098309 A1* | 4/2008 | Fries .................. G06F 9/451 |
| | | 715/734 |
| 2008/0195677 A1 | 8/2008 | Sudhakar et al. |
| 2008/0288637 A1 | 11/2008 | Nagaraja et al. |
| 2009/0144148 A1 | 6/2009 | Jung et al. |
| 2009/0216572 A1 | 8/2009 | Anderson |
| 2009/0276771 A1 | 11/2009 | Nickolov et al. |
| 2010/0064225 A1 | 3/2010 | Cunningham et al. |
| 2010/0180092 A1 | 7/2010 | Rajaa et al. |
| 2010/0257457 A1 | 10/2010 | De Goes |
| 2011/0047466 A1* | 2/2011 | Michelman .......... G06F 9/4443 |
| | | 715/734 |
| 2011/0173184 A1 | 7/2011 | Kelshikar et al. |
| 2012/0020581 A1 | 1/2012 | Zarom |
| 2012/0110046 A1 | 5/2012 | Oba |
| 2012/0303325 A1 | 11/2012 | Depue et al. |
| 2013/0055155 A1* | 2/2013 | Wong .................. G06F 8/65 |
| | | 715/810 |
| 2013/0108263 A1* | 5/2013 | Srinivas .............. H04Q 3/0083 |
| | | 398/45 |
| 2013/0124712 A1 | 5/2013 | Parker |
| 2013/0305364 A1 | 11/2013 | Haikney et al. |
| 2014/0369229 A1* | 12/2014 | Martineau ........... H04L 45/02 |
| | | 370/254 |
| 2015/0040052 A1* | 2/2015 | Noel .................. G06F 3/04847 |
| | | 715/771 |
| 2015/0229532 A1* | 8/2015 | Somaiya ............. H04L 41/22 |
| | | 715/736 |
| 2015/0350007 A1* | 12/2015 | Carlozzi ............. G06F 8/34 |
| | | 715/734 |
| 2016/0202851 A1* | 7/2016 | Turner ............... G06F 3/0482 |
| | | 715/734 |

* cited by examiner

Fig. 7

SERVER SYSTEM RING TOPOLOGY USER INTERFACE SYSTEM

RELATED APPLICATIONS

This application claims the benefit of the filing of application Ser. No. 14/464,579, filed on Aug. 20, 2014.

BACKGROUND

Modern datacenters include large numbers of physical and virtual entities. Examples of physical entities may include application servers, storage servers, load balancers, network interface cards (NICs), firewalls, switches, routers, etc. Almost any of these physical entities can be virtualized as software entities, such as virtual machines (VM), virtual firewalls, virtual switches, virtual routers, virtual extensible local area networks (VXLANs), etc.

Virtual entities increase the complexities of monitoring, troubleshooting, searching characteristics of, and visualizing these dynamically configurable networks. Existing systems may only monitor and collect data for a subset of physical or virtual components within the datacenter. Existing systems also may not be able to understand these new architectures, entities, and the relationships between these entities. Thus, present systems may not effectively monitor or visualize the physical and virtual entity configurations within modern datacenters, and may not provide adequate capabilities to search characteristics of such datacenters.

Additional aspects and advantages of this invention will be apparent from the following detailed description of preferred embodiments, which proceeds with reference to the accompanying drawings.

DETAILED DESCRIPTION

Figure 1:
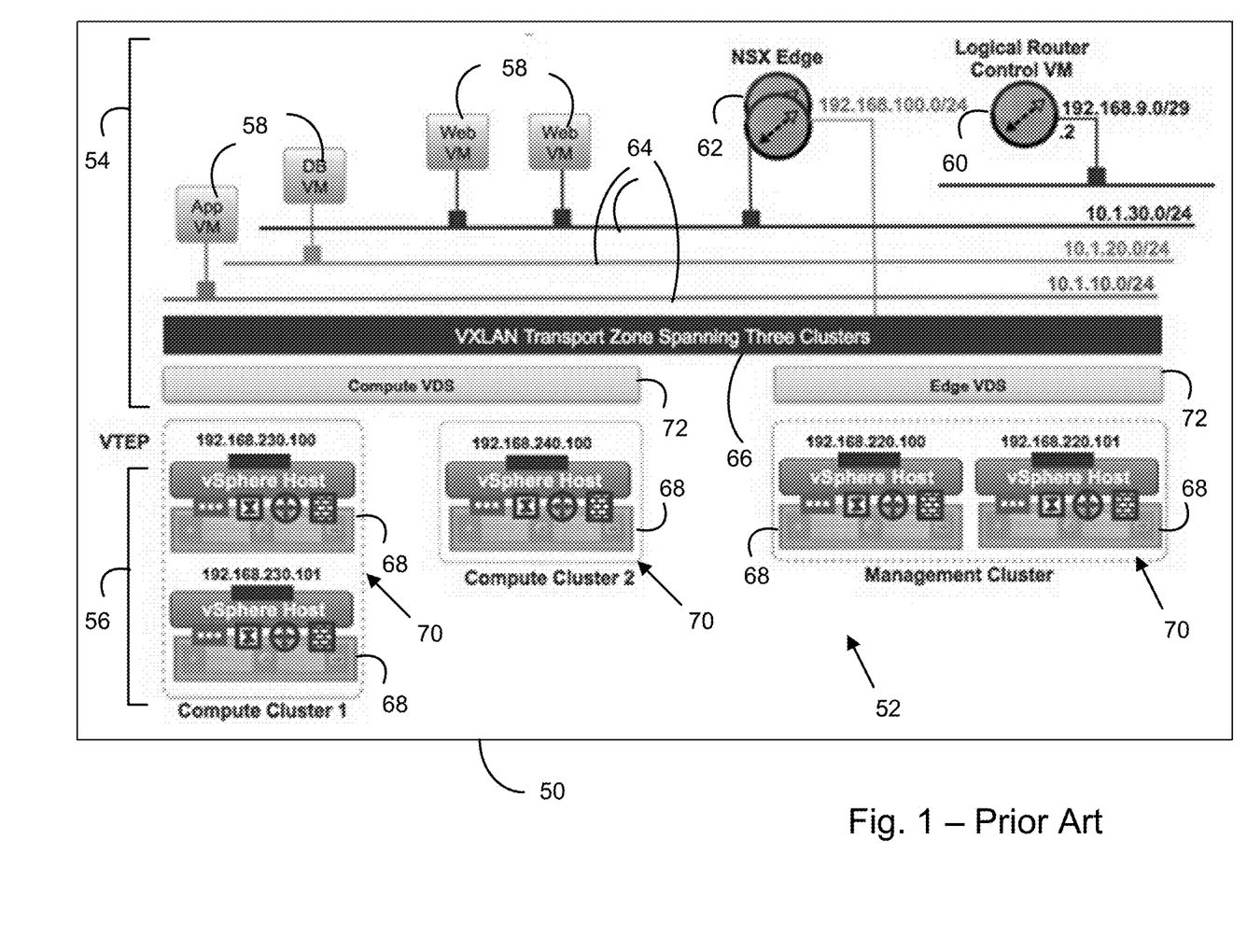
FIG. 1 is an illustration of an example of a prior art user visualization of a computer network.

FIG. 1 is an illustration of a prior art display or visualization 50 of an exemplary system of networked computer servers 52 (referred to as server system 52) that includes virtual entities 54 and physical entities 56. Virtual entities 54 may include, for example, any or all of various virtual machines 58, a logical router 60, and an edge router 62 that may be connected to various layer 2 networks 64 associated with a virtual extensible LAN (VXLAN) 66. Physical entities 56 may include, for example, any number of host computers or servers 68 that could be arranged physically or logically in any number of clusters 70. Interconnection between virtual entities 54 and physical entities 56 may be represented, for example, by one or more virtual distributed switches (VDSs) 72.

Visualization 50 provides only a generalized representation of virtual entities 54 and physical entities 56 of server system 52 without providing information about the interconnection between virtual entities 54 and physical entities 56, such as the transport pathways of data packets moving from one entity to another. As a result, visualization 50 provides at best a summary of virtual entities 54 and physical entities 56 included in server system 52, but fails to provide operational information about the operation of server system 52 and, in particular, packet pathways that illustrate the route a packet would travel from one virtual entity to another.

Figure 2:
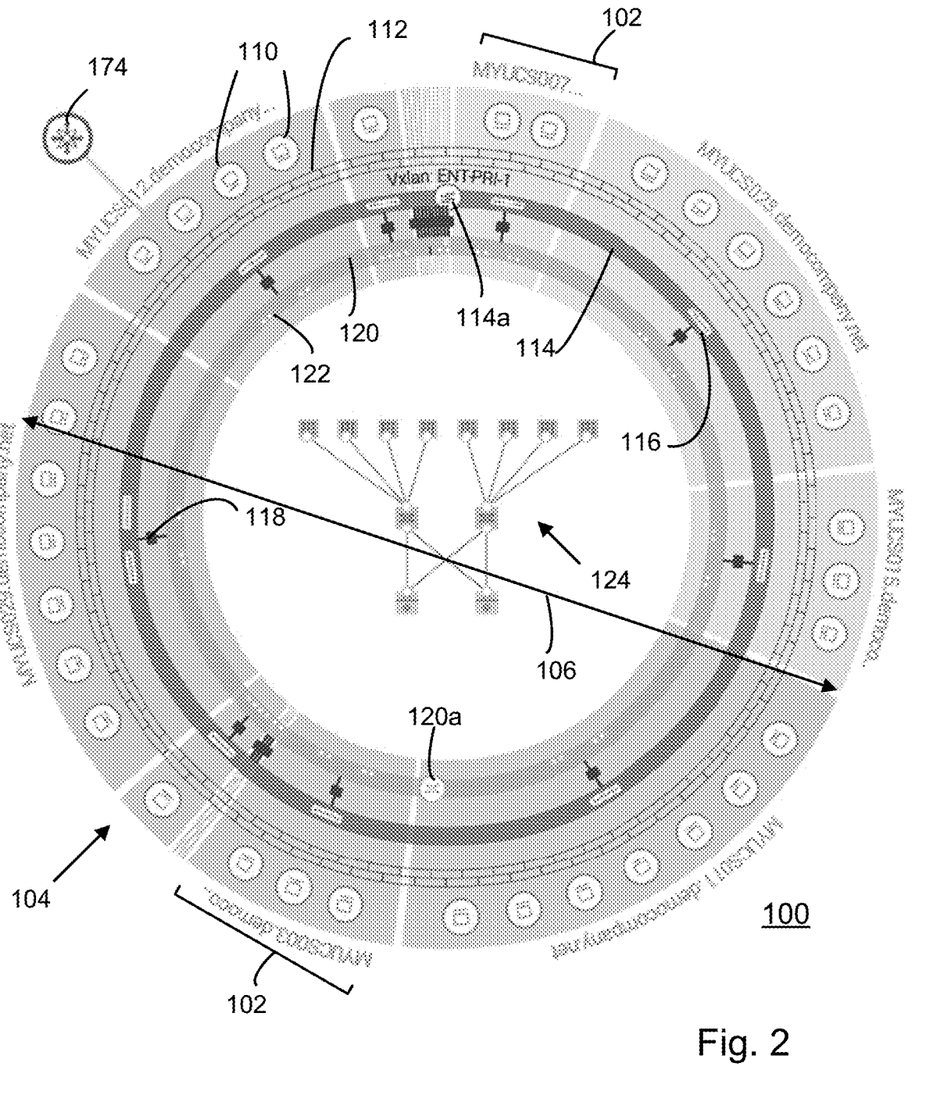
FIG. 2 is an illustration of a ring topology user interface to illustrate relationships between virtual and physical entities in a system of networked computer servers.

FIG. 2 depicts an example of a ring topology user interface 100 that is rendered on a computer display screen and includes graphical elements or icons to illustrate relationships between virtual and physical entities in a system of networked computer servers (sometimes referred to as a server system). For example, ring topology user interface 100 can represent virtual and physical entities in a server system operating as, or as part of, one or more datacenters that may includes physical components located in one or more geographical locations.

FIG. 2 ring topology user interface 100 is a mere example relating to an exemplary server system for purposes of describing aspects of the present invention. It will be appreciated that a ring topology user interface 100 according to the present invention would be rendered according to the particular components and arrangement of any actual server system. For clarity in FIG. 2, representative examples of a graphical element may be indicated by reference numerals without indicating all such elements. In addition, graphical elements in topology user interface 100 may be referred to merely by the names of the corresponding virtual or physical entities in the server system.

Ring topology user interface 100 includes a wedge or segment graphical element 102 to represent each of multiple physical hosts or servers in the server system. The host graphical elements 102 together form a ring topology 104 representing the server system and having an outer diameter 106. For example, host graphical elements 102 can be rendered in a common color to provide additional display information. The host graphical element 102 for each physical host includes graphical elements or icons that correspond to virtual and physical entities that reside on the host and are rendered as circular segments of different diameters.

In one implementation, host graphical element 102 may include as circular segments of successively decreasing diameter any or all of icons 110 indicating each of one or more virtual machines, an icon 112 indicating a firewall, a ring icon 114 indicating one or more VXLANs (i.e., virtual extensible local area networks) with a corresponding symbol icon 114a, icons 116 rendered within ring icon 114 indicating port groups providing networking functionality for the virtual machines, icons 118 indicating virtual tunnel endpaths (VTEPs), a ring icon 120 indicating an L2-type physical network with a corresponding symbol icon 120a, for example, and icons 122 in ring icon 120 indicating virtual distributed switches. It will be appreciated that in other implementations illustrating other server systems, ring topology user interface 100 could include icons corresponding to various other system components including virtual distributed routers, edge routers or gateways, virtual machine network interface cards, physical routers or switches, etc. For example, user interface 100 may include within ring topology 104 an optional display 124 of physical network entities, such as physical switches and routers, connecting the hosts 102.

Figure 3:
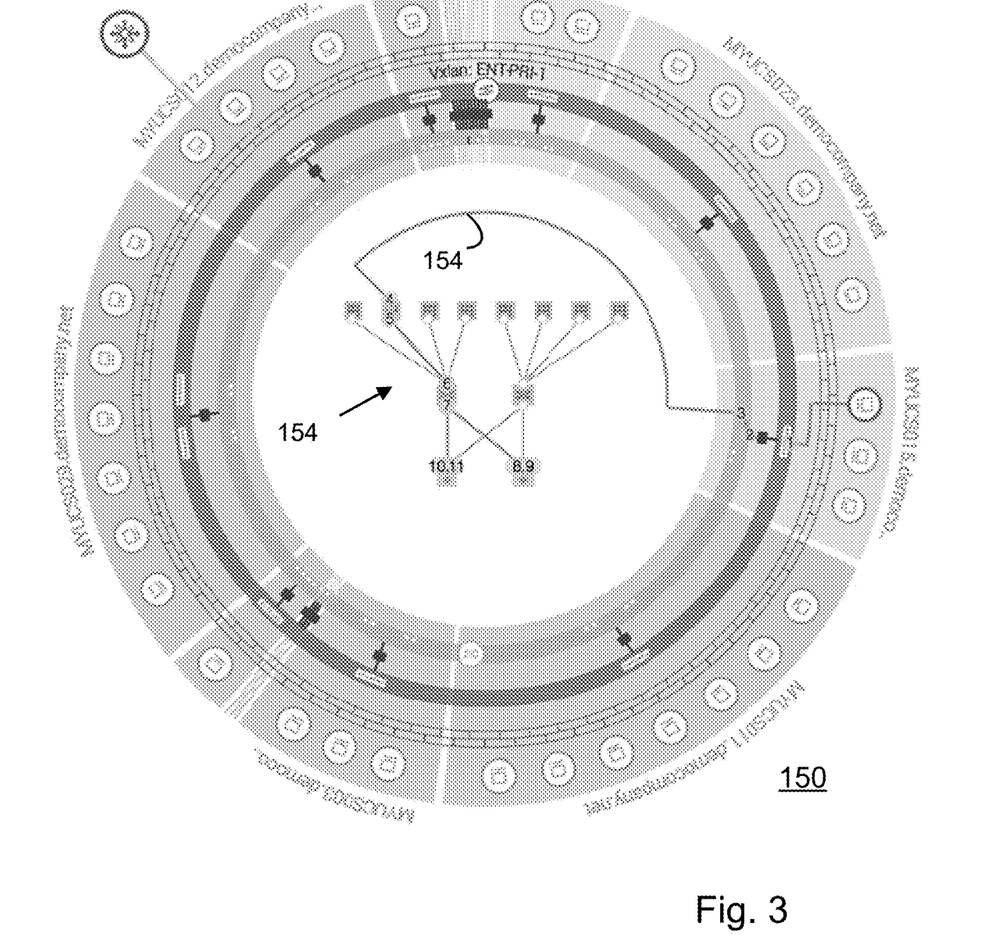
FIG. 3 is an illustration of an alternative ring topology user interface.
Figure 4A:
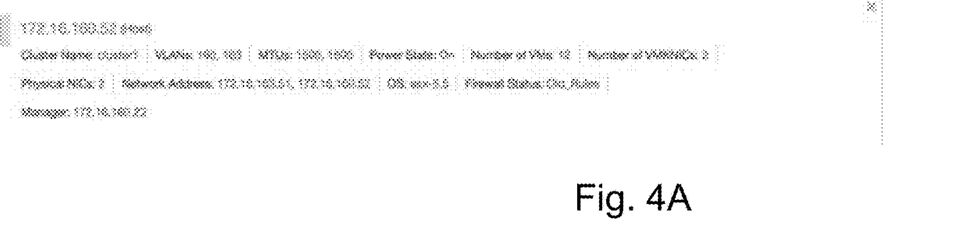
FIGS. 4A-4K illustrate sample entity information provided by user-activation of corresponding icon types in a ring topology user interface.
Figure 4B:
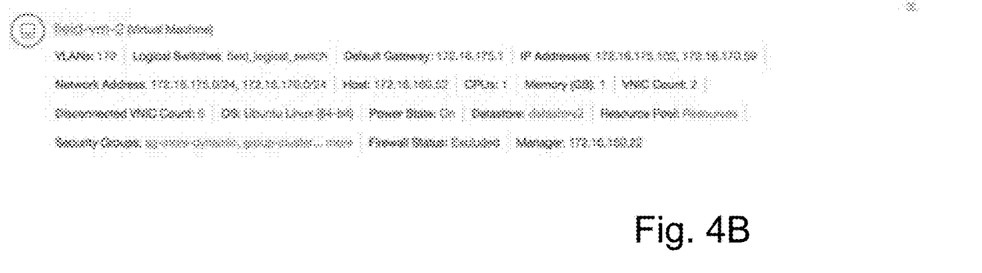
Figure 4C:
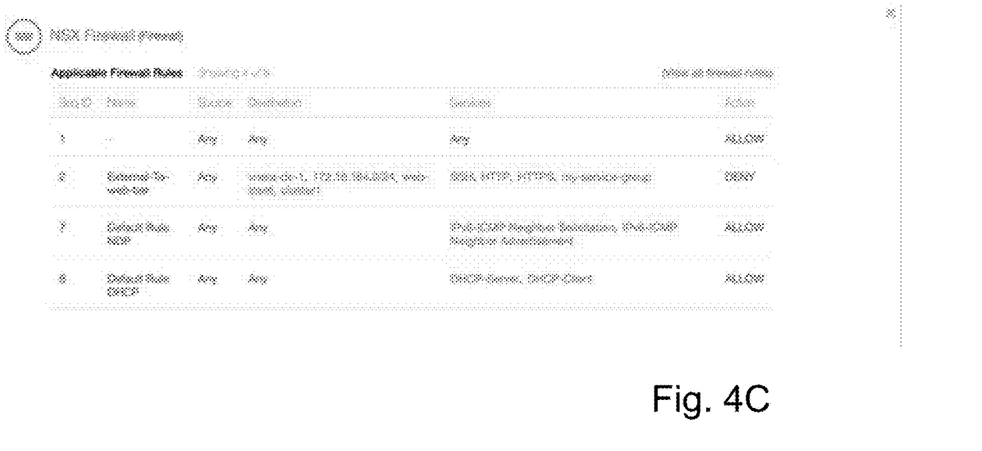
Figure 4D:
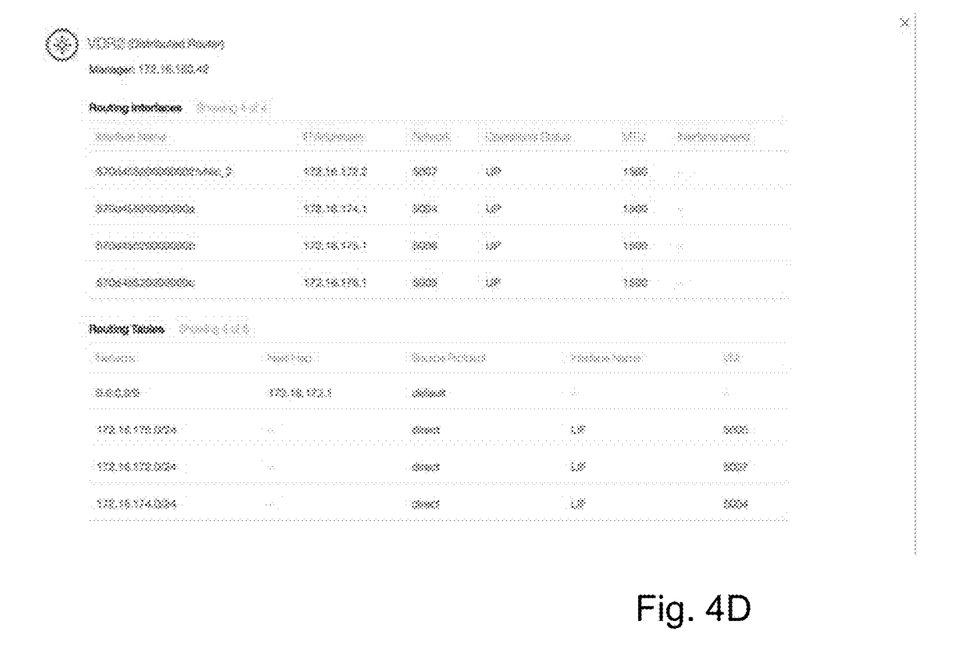
Figure 4E:
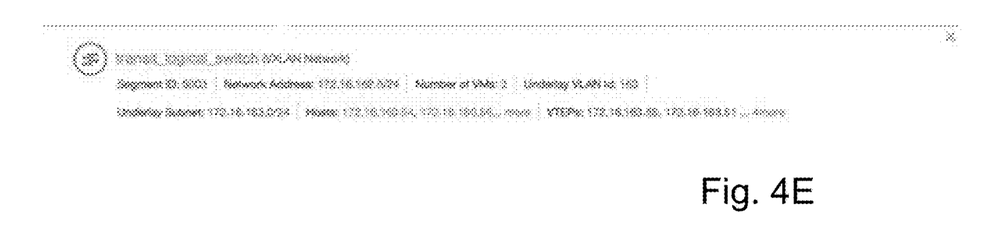
Figure 4F:
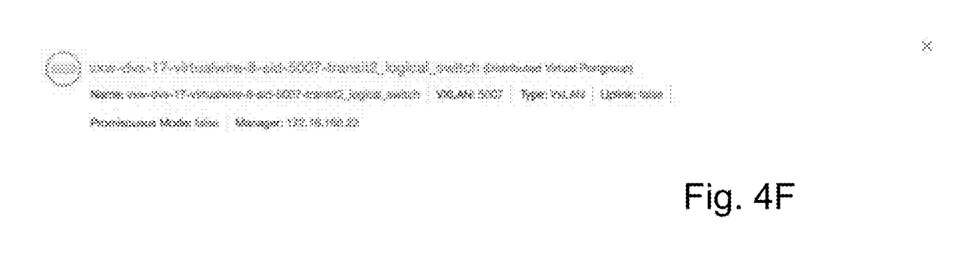
Figure 4G:
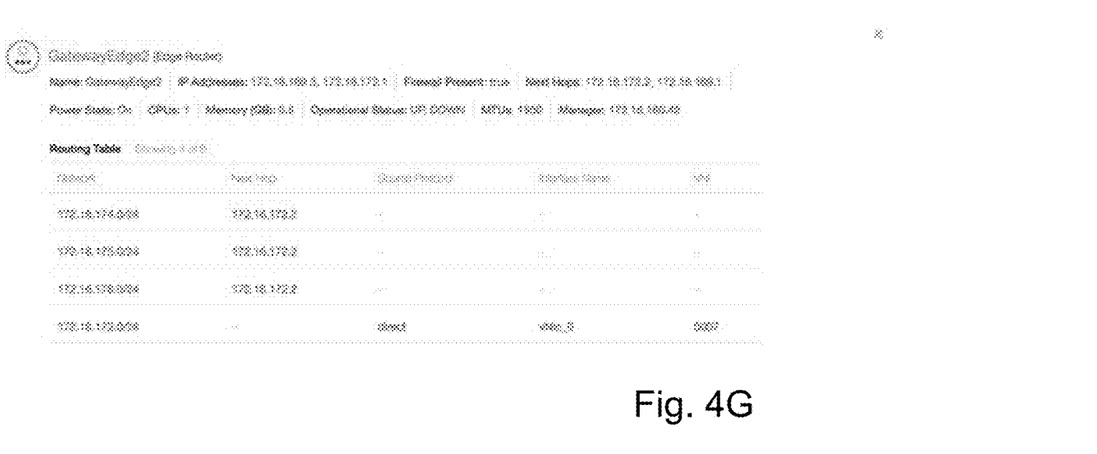
Figure 4H:
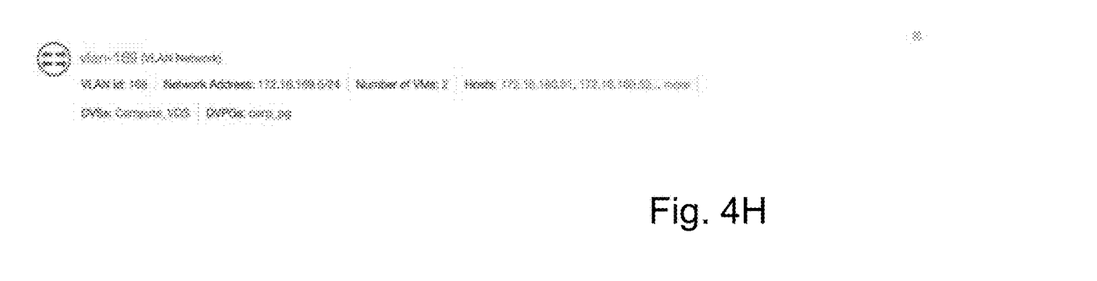
Figure 4I:
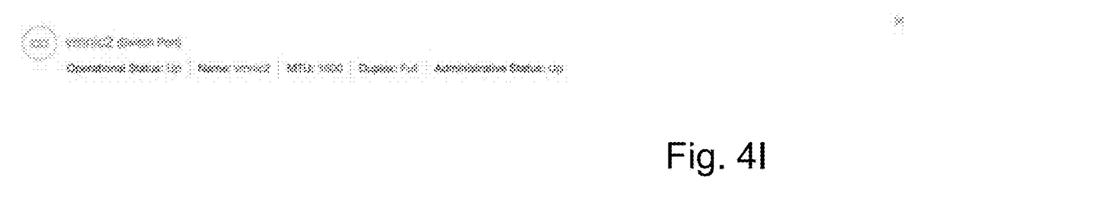
Figure 4J:
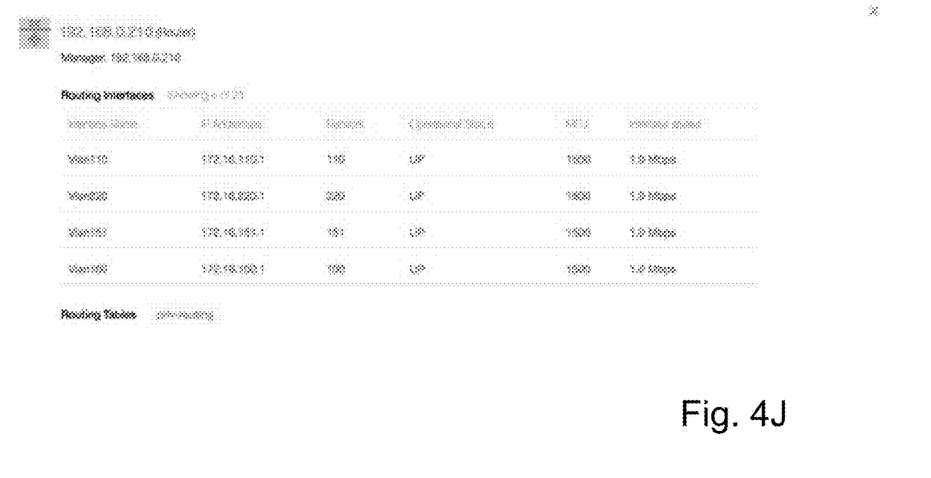
Figure 4K:
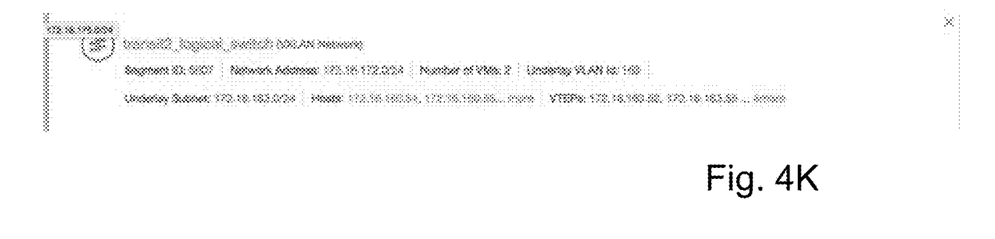

FIG. 3 is an illustration of an alternative ring topology user interface 150 indicating in a display 152 of physical network entities a packet pathway 154 along which a data packet would travel from a virtual machine to a physical switch. Packet pathway 154 indicates entities in numerical order in which they are encountered by a packet originating from the indicated virtual machine. In one implementation, user interface 150 could include a table listing each entity in sequence by its name, entity type, and any other desired information.

In addition to illustrating virtual and physical entities included in hosts of a server system, icons 102 and 110-122, and icons for any other elements or entities such as those of physical network display 124, may function as active links to additional information relating to the entity corresponding to each icon. FIGS. 4A-4K illustrate sample entity information that could be provided as a window or pop-up display by a user activating each type of icon listed in Table 1, which indicates for each of FIGS. 4A-4K a corresponding sample entity name and an entity type for which the displayed information is provided. It will be appreciated that the categories or classes of information listed in each of FIGS. 4A-4K would be displayed, if available, upon activation of the corresponding icon for that type of entity, but the actual information displayed in each category or class would reflect the information for the actual entity corresponding to the icon. Table 1 includes an entity type description that indicates the type of each of several types of sample entity. The type description may correspond to icons included in user interface 100.

TABLE 1

| FIG. | Entity Name | Information for Entity Type |
| --- | --- | --- |
| 4A | 172.16.160.52 | Physical host |
| 4B | web-vm-2 | source, virtual machine |
| 4C | NSX Firewall | firewall |
| 4D | VDR2 | virtual distributed router |
| 4E | VXLAN Network | VXLAN Network |
| 4F | transit_logical_switch | Virtual Extensible Local Area Network (VXLAN) (distributed logical portgroup) |
| 4G | GatewayEdge2 | edge router |
| 4H | VLAN -169 | VLAN Network |
| 4I | vmnic2 | vmknic or pnic (physical nic on the physical host server) |
| 4J | 192.168.0.210 | Physical router or switch |
| 4K | VXLAN Network | VXLAN Network |

Listings of information that may be obtained by user-activation of various icons are listed below in Tables 2A-2C according to the type of entity:

TABLE 2A

| Virtual Machine | NSX Firewall | Virtual Distributed Router | Host |
| --- | --- | --- | --- |
| Name | Applicable Firewall Rules Count and Details as | Name | Name |
| VLAN Names | Seq ID | NSX Manager IP/Name | Cluster Name |
| Logical Switch names | Name | Routing Interfaces Count and Details | VLAN Name |

TABLE 2A-continued

| Virtual Machine | NSX Firewall | Virtual Distributed Router | Host |
| --- | --- | --- | --- |
| Default Gateway Address | Source | Interface Names | MTU Values |
| IP Address Network Addresses | Destination Services | IP Addresses Network | Power State Virtual Machine Count |
| Host name CPU Count | Action | Operational Status MTU | VMKNIC Count Physical NIC Count |
| Memory | | Interface Speed | Network Addresses |
| Virtual NIC Count | | | Operating System Name |
| Operating System Name | | Route Count | Firewall Status |
| Power State | | Routing Table Details | vCenter Manager |
| Data Store Name Resource Pool Name | | Network Next Hop | |
| Security Group Names | | Source Protocol | |
| Firewall Status vCenter Manager IP/Name | | Interface Name VNI | |

TABLE 2B

| VXLAN Network/Logical Switch/Virtual Wire | VLAN Network | Physical NIC (PNIC) | Distributed Virtual Port Group (DVPG) |
| --- | --- | --- | --- |
| Name | Name | Name | Name |
| Segment ID | VLAN ID | Operational Status | VxLAN Name |
| Network Address | Network Address | MTU Value | Uplink Status |
| Virtual Machine Count | Virtual Machine Count | Duplexing Status | Promiscuous Mode |
| Underlay VLAN ID | Host Names | Administrative Status | vCenter Manager IP/Name |
| Underlay Subnet Host Names | Distributed Virtual Switch Name Distributed Virtual Port Group Name | | |
| VTEPs | | | |

TABLE 2C

| L3 Switch Device | Edge Router |
| --- | --- |
| Name | Name |
| Manager IP/Name | IP Addresses |
| Routing Interfaces Count and Details | Firewall Status |
| Interface Names | Next Hops |
| IP Addresses | Power Status |
| Network | CPU Count |
| Operational Status | Memory |
| MTU | Operational Statuses |
| Interface Speed | MTU Values |
| Route Count | NSX Manager IP/Name |
| Routing Table Name and Details | |
| Network | Route Count |
| Next Hop | Routing Table Details |
| Source Protocol | Network |
| Interface Name | Next Hop |
| VNI | Source Protocol |
| | Interface Name |
| | VNI |

Figure 5:
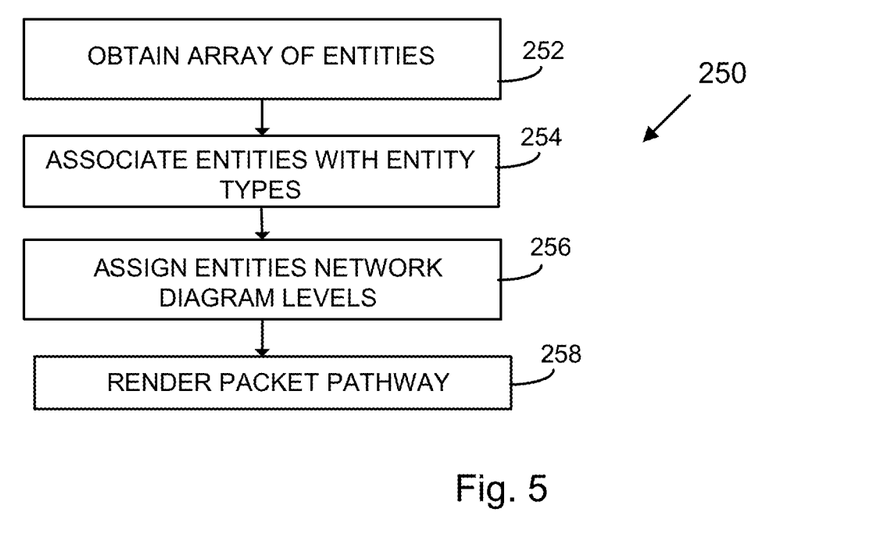
FIG. 5 is a flow diagram of a computer-executed ring topology user interface method.

FIG. 5 is a flow diagram of a computer-executed server system ring topology user interface method 250. Interface method 250 is capable of providing either of user interface 100 and 150, for example.

Process step 252 indicates that an array of entities is obtained corresponding to a server system. For example, the array of entities and entity links may be obtained by operation of a datacenter management system 300 (FIG. 6), described below in greater detail.

Process step 254 indicates that each entity in the array of entities is associated with a corresponding entity type. For example, the entity types may include any or all of virtual machine, virtual machine, network interface card, virtual distributed router, edge router or gateway, switch and VXLAN, VLAN, virtual machine network interface card, physical router or switch, etc. It will be appreciated that these entity types are illustrative and that any type of virtual or physical entity could be included.

Process step 256 indicates that entities in the array of entities are assigned predefined network diagram levels. In this implementation, for example, hosts are assigned a first level and subsequent entities are assigned subsequent levels according to general network interconnection conventions to indicate increasingly remote physical or logical connectedness.

Process step 258 indicates that a server system ring topology user interface is generated and rendered on a display screen.

Figure 6:
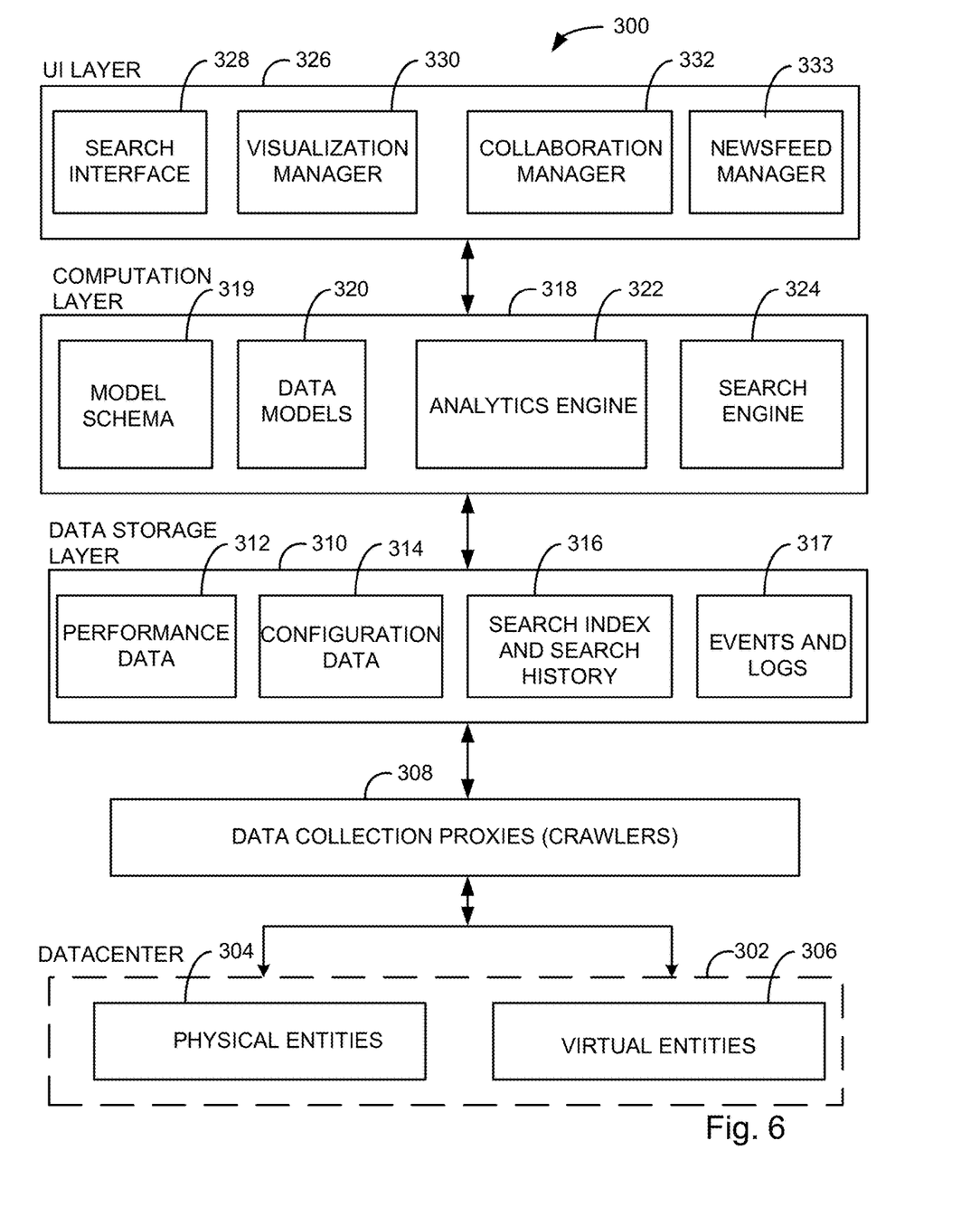
FIG. 6 is a block diagram of an example datacenter management system.

FIG. 6 is a block diagram illustrating a datacenter management system 300 as an operating environment of the present invention. A natural language based search engine operates within the context of the datacenter domain and identifies the intent of search queries. The search engine uses the models to more efficiently search and visualize current and historical events within the datacenter. The search engine also includes a collaboration feature that enables users to more effectively exchange datacenter information.

FIG. 6 depicts datacenter management system 300 in association with a datacenter 302 that includes various physical entities 304 and virtual entities 306. Physical entities 304 may comprise any physical devices used for processing, storing, and/or exchanging data. A few examples of physical entities 304 include application servers, storage servers, load balancers, network interface cards (NICs), firewalls, switches, routers, client devices, etc. Virtual entities 306 may include any entities virtualized in software, such as virtual machines (VM), virtual firewalls (VFW), virtual switches, virtual routers, virtual extensible local area networks (VXLANs), etc. Datacenter 302 also may include different logical entity relationships, such as layer 2 and layer 3 logical networks. These are just examples of an almost limitless number of different physical and virtual entities and relationships that may exist within datacenter 302.

Datacenter management system 300 may use time-series based modeling of entities and properties (Objects) to effectively capture the evolving state of a datacenter. Models represent physical, virtual, and logical entities and entity relationships for different periodic and aperiodic events. The management system captures different performance data and configuration data associated with the entities. The performance data measures performance of different entities, such as central processing unit (CPU) utilization, memory utilization, packet drops, etc. The configuration data identifies configurations within entities, such as the number of CPUs assigned to a virtual machine or the rules used by a physical or virtual firewall.

Data collection proxies 308 are alternatively referred to as crawlers and collect and store data from physical entities 304 and virtual entities 306 in a data storage layer 310. The data may include performance data 312, configuration or change data 314, and event and log data, such as alerts, problems, faults, etc. Management system 300 also may store search indexes and search histories 316 from search queries.

Performance data 304 may be associated with the performance of any entity or combination of entities in datacenter 302. Examples of performance data 312 include CPU utilization, packet processing, packet transmission and reception drops, memory utilization, etc. Examples of configuration data 314 include any information associated with the configuration of any entity or combination of entities in datacenter 302. Examples of configuration data 314 include a number of CPUs assigned to a VM, network and communication paths in a VXLAN, rules in a physical or virtual firewall, NICs connected to a VM, changes in system configurations, etc. These are just a few examples of almost limitless types of performance and configuration data.

Data collection proxies 308 may periodically collect performance data 312 and/or configuration data 334. For example, proxies 308 may monitor CPU utilization for a VM every ten minutes and save the utilization values as part of performance data 312. Data collection proxies 308 may aperiodically collect other performance data 312 and/or configuration data 314. For example, collection proxies 308 may identify the number of CPUs assigned to a VM as part of configuration data 314.

Data collection proxies 308 may include any combination of existing and customized programs for monitoring and extracting data from entities 304 and 306. For example, physical entities 304, such as routers and switches, may include application program interfaces (APIs) for extracting CPU utilization, memory utilization, packet drops, routing tables, logged data, address resolution protocol (ARP) tables, etc.

A computation layer 318 uses the data in storage layer 310 to provide information to a user interface layer 326. A model schema 319 identifies the general relationships and properties associated with entities in datacenter 302. Data models 320 represent the particular performance data 312 and configuration data 314 associated with the entities in datacenter 302. For example, CPU and memory utilization, logical and physical connections, end-to-end communication paths, logical layer 2 and layer 3 network connections, application topologies, VXLAN topologies, port groups, etc. Some data models 320 are manually created and other data models 320 may be dynamically generated.

Analytics engine 322 automatically monitors and identifies data and other events. Analytics engine 322 may include event detectors that identify significant events in datacenter 302. For example, the event detector may identify configuration changes and performance data representing the performance status of datacenter 302. Analytics engine 322 may also operate as outlier detector that identifies events that are outside normal operating levels. For example, an outlier detector may identify CPU utilization above a particular threshold level. Analytics engine 322 may also operate as a problem detector that identifies problems in datacenter 302. For example, the problem detector may identify large packet losses or configuration mismatches between entities.

Search engine 324 conducts natural language searches within datacenter 302 and identifies a search query intent based on model schema 319 and a datacenter dictionary. Instead of operating just on keywords, search engine 324 also understands search query phrases that may be part natural language and part expression. This provides richer intent expression, greater ease of use, and applies well to the datacenter problem domain. For example, a search term such as TROUBLESHOOT may cause search engine 324 to search problem data generated by analytics engine 322.

Search engine 324 may operate as a time machine executing queries for specified time intervals. For example, a user may enter a search term requesting search engine 324 to show all configuration changes for a specified network over the past two days. In another example, the user may enter a search term requesting CPU usage for a host device over the last two days. Data models 320 may be configured in a unique time series format that enables search engine 324 to quickly identify events for any selectable time period.

Data models 320 may include identifiers associated with different physical and virtual entities, networks, performance data, and/or configuration data. Search engine 324 may search for data or provide search suggestions based on data models 320. For example, one of data models 320 for a virtual firewall may contain firewall rules. A user may enter the search term RULES. Search engine 324 may identify the firewall rules in the model or provide a suggestion for displaying the rules identified in the virtual firewall model.

User interface layer 326 includes a search interface 328 for receiving search queries and displaying search results. Search interface 328 may receive natural language based expressions for search engine 324 and display the results from search engine 324 in a textual and/or graphical format. A visualization manager 330 generates topology diagrams representing different entities and network configurations within the datacenter.

A collaboration manager 332 captures particular states of the datacenter and enables different users to view, share, and manipulate the captured states. For example, a first user may identify a network state where a large number of packets are being dropped. The first user may direct collaboration manager 332 to capture that state of the network and identify a second user for sharing the captured state. The second user can access the captured network state and perform additional analysis.

A newsfeed manager 333 identifies and displays events of particular interest to the user. For example, newsfeed manager 333 may identify a search index and/or search history 316 for a user currently logged on to the system. For example, a user may have previously performed search queries for a particular logical network. When the user logs in, newsfeed manager 333 may automatically display events associated with the previously queried logical network.

Search engine 324 and search interface 328 together function as a search system that provides interpretation of computer network status search queries that are entered by users, and performs corresponding searches relating to datacenter 302. Examples of interpretations of computer network status search queries, which are syntactically similar, include:

"vm web-vm-1"⇒"find virtual machine named web-vm-1" since web-vm-1 looks like a virtual machine name.

"vm 192.168.0.0/16"⇒"find all virtual machines in subnet 192.168.0.0/16" since 192.168.0.0/16 depicts a subnet.

"vm cpu 1"⇒"find virtual machines where num cpu=1" since cpu probably refers to property called "num cpu" and 1 is a possible value for this property.

"vm powered on"⇒"find virtual machines where power state=on" since "powered on" is commonly used to refer to property "power state" having the value "on".

In some instances, a computer network status search query can suggest more than one interpretation, even if one interpretation is deemed more likely than another, so that the more-likely interpretation is offered as a default, but a user-selectable alternative interpretation is also offered:

"vm cpu"⇒"show num cpu, cpu usage of virtual machines" since cpu probably refers to cpu related properties, but an alternative user-selectable interpretation that is offered can be "find virtual machine named cpu".

"vm not behind firewall"⇒"find virtual machines where firewall status='unprotected' or firewall status='excluded' since "not behind firewall" refers to property "firewall status" having a value 'unprotected' or 'excluded,' but an alternative user-selectable interpretation that is offered can be "find virtual machines where firewall status='unprotected' as the user might only be interested in property "firewall status" having the value "unprotected".

As illustrated by the examples above, search queries with similar syntactic structure can have very different interpretations.

Figure 7:
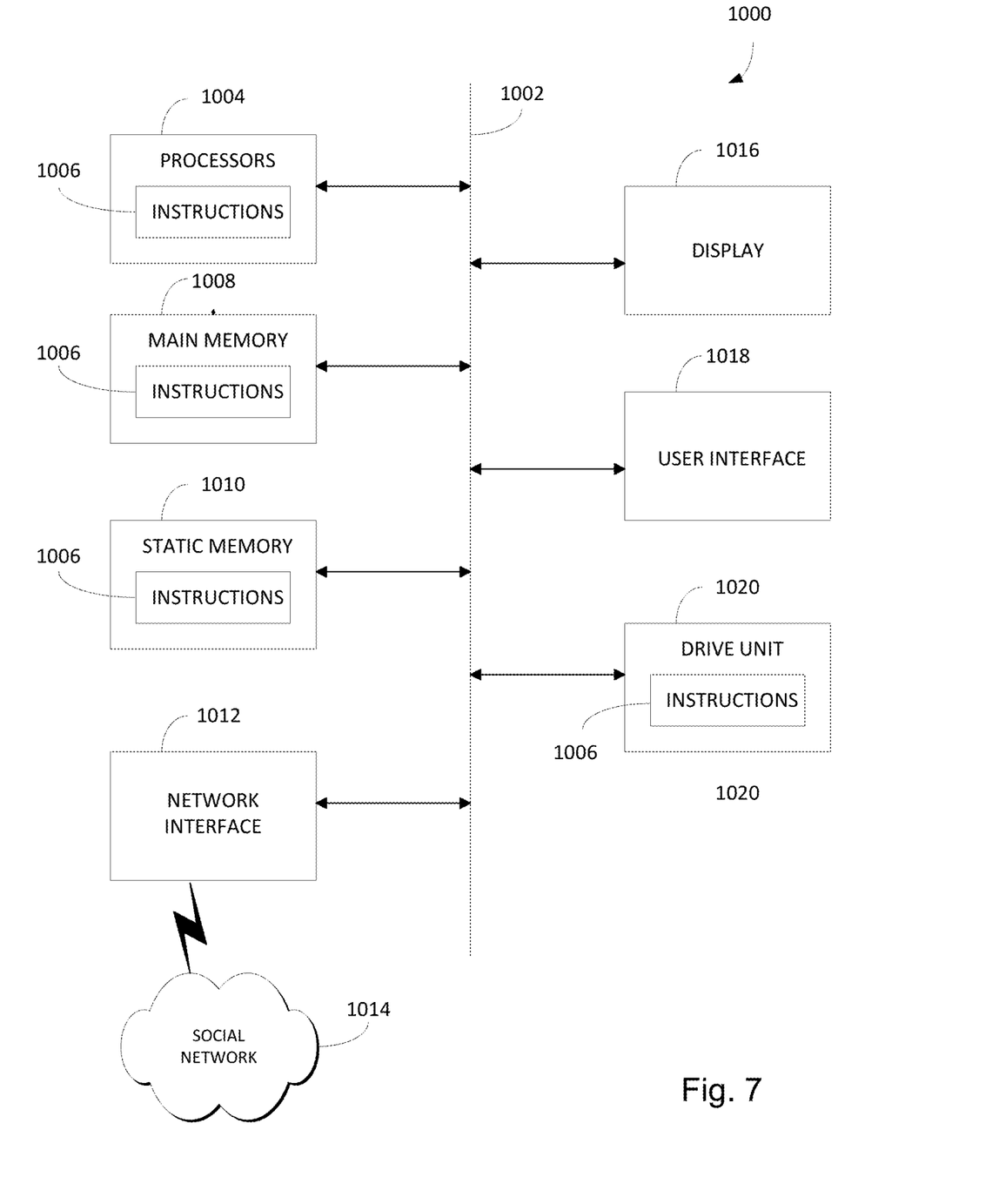
FIG. 7 depicts an example computing device for implementing the datacenter management system.

FIG. 7 shows a computing device 1000 that may be used for operating the datacenter management system and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

It will be obvious to those having skill in the art that many changes may be made to the details of the above-described embodiments without departing from the underlying principles of the invention. The scope of the present invention should, therefore, be determined only by the following claims.

The invention claimed is:

1. A computerized visualization system ("visualization system"), the visualization system comprising:
   a computer display screen; and
   a management system that provides modeling of a computer system having physical entities and virtual entities;
   wherein the management system is configured to render a ring topology on the computer display screen, the ring topology including:
   a center;
   a plurality of concentric rings;
   an arrangement of plural active icons corresponding to the physical entities and the virtual entities included in the computer system, each of the plural active icons being arranged within one of the center and an arc segment of a respective one of the plurality of concentric rings;
   wedge elements corresponding to physical hosts of the computer system, each wedge element of the wedge elements:
   is defined at least by a respective set of arc segments of the concentric rings extending over a respective angular segment of the ring topology; and
   includes a portion of the plural active icons representing virtual machines associated with a physical host corresponding to the wedge element; and
   connections between a portion of the physical entities that connect the physical hosts represented by the wedge elements.

2. The visualization system of claim 1, wherein the virtual entities are positioned at outermost radii of the concentric rings in the arrangement.

3. The visualization system of claim 2, wherein the virtual entities include at least one physical network element with a physical network switch and one or more virtual networking elements, each of the one or more virtual networking elements including at least one virtual network switch, wherein the one or more virtual networking elements are positioned in the arrangement at greater radii of the concentric rings than the at least one physical network element.

4. The visualization system of claim 2, wherein respective active icons for the virtual entities are positioned in the arrangement laterally offset from each other at the outermost radii of the concentric rings.

5. The visualization system of claim 1, wherein one or more entities from the physical entities and the virtual entities reside on each of the physical hosts, and wherein the arrangement includes, for each of the one or more entities, an active icon positioned within an arc segment of one of the wedge elements that corresponds to one of the physical hosts on which the one or more entities resides.

6. The visualization system of claim 1, wherein the virtual entities include plural virtual networking elements that include at least one virtual network switch associated with each of the physical hosts, and wherein the arrangement includes each of the at least one virtual network switches positioned in one of the plurality of concentric rings.

7. The visualization system of claim 6, wherein the plural virtual networking elements include a virtual extensible local area network.

8. The visualization system of claim 1, wherein the virtual entities in the outermost radii of the plurality of concentric rings include virtual machines.

9. The visualization system of claim 1, wherein the computer system is included in a datacenter.

10. A computerized visualization method, the method comprising:
   modeling of a computer system having physical entities and virtual entities; and
   rendering a ring topology on a computer display screen, the ring topology including:
   a center;
   a plurality of concentric rings;
   an arrangement of plural active icons corresponding to the physical entities and the virtual entities included in the computer system, each of the plural active icons being arranged within one of the center and an arc segment of a respective one of the plurality of concentric rings;

wedge elements corresponding to physical hosts of the computer system, each wedge element of the wedge elements:

is defined at least by a respective set of arc segments of the concentric rings extending over a respective angular segment of the ring topology; and includes a portion of the plural active icons representing virtual machines associated with a physical host corresponding to the wedge element; and connections between a portion of the physical entities that connect the physical hosts represented by the wedge elements.

11. The method of claim 10, wherein rendering the arrangement includes positioning the virtual entities at outermost radii of the concentric rings in the arrangement.

12. The method of claim 11, wherein the virtual entities include at least one physical network element with a physical network switch and one or more virtual networking elements, each of the one or more virtual networking elements including at least one virtual network switch, and wherein the one or more virtual networking elements are positioned in the arrangement at greater radii of the concentric rings than the at least one physical network element.

13. The method of claim 11, wherein respective active icons for the virtual entities are positioned in the arrangement laterally offset from each other at the outermost radii of the concentric rings.

14. The method of claim 10, wherein one or more entities from the physical entities and the virtual entities reside on each of the physical hosts, and wherein the arrangement includes, for each of the one or more entities, an active icon positioned within an arc segment of one of the wedge elements that corresponds to one of the physical hosts on which the one or more entities resides.

15. The method of claim 10, wherein the virtual entities include plural virtual networking elements that include at least one virtual network switch associated with each of the physical hosts, and wherein the arrangement includes each of the at least one virtual network switches positioned in one of the plurality of concentric rings.

16. The method of claim 11, wherein the virtual entities in the outermost radii of the concentric rings include virtual machines.

17. A non-transitory, computer-readable medium containing instructions that, when executed by a processor of a computing device, perform stages for displaying a visualization of a computer system having physical entities and virtual entities, the stages comprising:

modeling the computer system; and displaying a ring topology for the computer system, the ring topology, as displayed, including:

a center;

a plurality of concentric rings;

an arrangement of plural active icons corresponding to the physical entities and the virtual entities included in the computer system, each of the plural active icons being arranged within one of the center and an arc segment of a respective one of the plurality of concentric rings;

wedge elements corresponding to physical hosts of the computer system, each wedge element of the wedge elements:

is defined at least by a respective set of arc segments of the concentric rings extending over a respective angular segment of the ring topology; and includes a portion of the plural active icons representing virtual machines associated with a physical host corresponding to the wedge element;

connections between a portion of the physical entities that connect the physical hosts represented by the wedge elements.

18. The non-transitory, computer-readable medium of claim 17, wherein displaying the arrangement includes positioning the virtual entities at outermost radii of the concentric rings in the arrangement.

19. The non-transitory, computer-readable medium of claim 17, wherein displaying the arrangement includes positioning icons for the virtual entities laterally offset from each other at the outermost radii of the concentric rings.

20. The non-transitory, computer-readable medium of claim 17, wherein the virtual entities include plural virtual networking elements that include at least one virtual network switch associated with each of the physical hosts, and wherein the arrangement includes each of the at least one virtual network switches positioned in one of the plurality of concentric rings.

* * * * *